Patented Sept. 13, 1938

2,130,105

UNITED STATES PATENT OFFICE 2,130,105

STORAGE BATTERY ELECTRODE AND METHOD OF MAKING THE SAME

John A. Schaeffer and Harold R. Harner, Joplin, Mo., assignors to The Eagle-Picher Lead Company, Cincinnati, Ohio, a corporation of Ohio No Drawing. Application June 27, 1935, Serial No. 28,765

12 Claims. (Cl. 136—26)

Our invention relates to the manufacture of storage battery electrodes, and more particularly to the manufacture of negative electrodes, or spongy-lead electrodes for lead acid type storage batteries, and has for its object to provide a negative electrode and a method for manufacturing the same, which electrode as compared with electrodes previously manufactured will have its active material in such a condition of particle subdivision and physical structure as to yield markedly increased initial capacity especially at high rates of discharge and low temperatures and to maintain that increased yield longer during the use of the electrode than has heretofore been possible.

Our invention consists in the preparation of an organic compound and the incorporation of this compound into the active material, or material to be made active, in a lead acid storage battery electrode either prior to or after incorporation into the storage battery grid and which readily combines with the lead compound or lead compounds to produce what we call protective action by preventing the growth of large spongy-lead crystals or particles and producing on formation spongy lead particles which are submicroscopic in size, thereby increasing tremendously the specific surface of the active material in the plate as compared with the active material of plates made from the same lead compound or compounds but without our organic compound.

In the preparation of our organic compound we use as the raw material certain carbohydrates comprising plant residue or agricultural waste of the group including tanbark, straw, corn stalks, sawdust or leaves, and from this we prepare a compost by aerobic decomposition. We may select tanbark as an example. A compost is prepared which will contain per 100 pounds of material about 30 pounds of dry matter and 70 pounds of water. The mixture is allowed to undergo decomposition, in the presence of sufficient available nitrogen and with proper aeration, for a period of 6 to 24 weeks, depending on temperature and nature of material. At the end of the decomposition period, the compost is ready. To approximately 3,000 parts by weight of this compost with a moisture content of 30% we add 10,000 parts of water and a mineral acid, of which sulphuric acid is an example, until the entire mass is distinctly acid, when the whole is placed in a container and kept at boiling temperature for a period of approximately 8 hours and then allowed to cool, during which time the solid particles settle to the bottom while the supernatant, clear liquor is decanted to waste. That portion remaining in the tank is again admixed with water and additional sulphuric acid sufficient to maintain the acidity of the solution introduced. The mixture is boiled for an additional period of 8 hours, when the whole is allowed to settle and the supernatant liquor decanted to waste. The residue remaining in the tank is then washed with boiling water, filtered and dried. The dried residue is extracted with boiling alcohol and the combined alcohol extract evaporated to dryness. The resulting compound is added to the active material or material to be made active in a lead acid storage battery electrode and when made into a paste with desirable vehicle, applied to negative storage battery grids and treated by suitable means in process forms a negative storage battery electrode characterized by improved initial capacity particularly in high rate and low temperature discharge.

Without desiring to restrict ourselves to the proportions named, we have found that good results can be achieved by the mixture of one part by weight of our organic compound with five hundred parts by weight of the lead materials used in compounding the paste for the plates, giving 0.2% of organic material in the dry blend. Again, we may form a lead salt or complex of our organic compound by adding lead oxide such as litharge, or a lead salt, to a solution of our organic material, whereupon a precipitate of lead-organic salt or complex is formed. The amount of organic compound in the lead-organic complex may be varied at will by varying the relative amount of lead oxide or lead salt added, although we prefer to form a lead-organic complex containing about 5% by weight of organic material. This lead-organic complex may then be dried, pulverized, and added to the other lead materials used in compounding the paste for the electrodes so as to provide the desired amount of organic compound in the dry blend. It is understood that the percentages named are approximate only, and that we may vary them with the type of lead materials used, and with the results desired. We have used up to 1% by weight of our organic compound with good results, and for special purposes even more than that amount might be desirable.

To prepare our active material for incorporation in the interstices of the storage battery grid we add certain lead compounds comprising lead oxide or a mixture of lead oxides of the group including litharge, red lead, orange mineral, basic lead sulphate, or lead suboxide with or without finely divided metallic lead, or we may use finely divided metallic lead alone, and place these in a mixer where the whole is brought to pasting consistency by the addition of water, acid, or water and acid. To this we then add our organic compound, or a precipitate formed by the addition of lead oxide or lead salt to a solution of our organic compound, and the mixer is further operated until the organic ingredients are thoroughly incorporated into the mass. In place of adding our organic compound separately we may add it simultaneously with the other materials, and instead of adding it in the wet mix it may be added to the dry blend, the same results being achieved regardless of the method by which our material is added.

By our invention the electrodes produced from a paste containing our organic material have increased initial capacity, especially at high rates of discharge and at low temperature due to the extremely fine state of particle subdivision produced in the spongy-lead active material on formation of the plates containing our organic material, and better maintenance of this high capacity, due to the continued protective action of our organic material preventing the growth of large spongy-lead particles.

Having thus described our invention what we claim as new and desire to secure by Letters Patent, is:

1. A paste for lead acid storage battery electrodes consisting of one or more oxides of lead thoroughly mixed with a substance resulting from the treatment of a compost of carbohydrates comprising plant residue or agricultural waste of the group including tanbark, straw, corn stalks, sawdust or leaves, with sulphuric acid solution, boiling the solution, filtering and drying the residue, extracting the residue with alcohol and evaporating the alcohol.

2. A paste for lead acid storage battery electrodes consisting of finely divided metallic lead thoroughly mixed with a substance resulting from the treatment of a compost of carbohydrates comprising plant residue or agricultural waste of the group including tanbark, straw, corn stalks, sawdust or leaves, with sulphuric acid solution, boiling the solution, filtering and drying the residue, extracting the residue with alcohol and evaporating the alcohol.

3. A paste for lead acid storage battery electrodes consisting of finely divided metallic lead together with one or more oxides of lead, thoroughly mixed with a substance resulting from the treatment of a compost of carbohydrates comprising plant residue or agricultural waste of the group including tanbark, straw, corn stalks, sawdust or leaves, with sulphuric acid solution, boiling the solution, filtering and drying the residue, extracting the residue with alcohol and evaporating the alcohol.

4. The method of preparing a paste for use in the manufacture of lead acid storage battery electrodes which comprises mixing lead compounds with a substance resulting from the treatment of a compost of carbohydrates comprising plant residue or agricultural waste of the group including tanbark, straw, cornstalks, sawdust, or leaves, with sulphuric acid solution, boiling the solution, filtering and drying the residue, extracting the residue with alcohol and evaporating the alcohol.

5. The method of controlling the activity of lead acid storage battery electrodes comprising the addition of one or more oxides of lead to a precipitate resulting from the treatment of a compost of carbohydrates comprising plant residue or agricultural waste of the group including tanbark, straw, corn stalks, sawdust or leaves, with sulphuric acid solution, boiling the solution, filtering and drying the residue, extracting the residue with alcohol, and evaporating the alcohol.

6. The method of preparing paste for lead acid storage battery electrodes characterized by the presence of spongy-lead particles which are submicroscopic in size, comprising treating a compost of carbohydrates comprising plant residue or agricultural waste of the group including tanbark, straw, corn stalks, sawdust or leaves, with sulphuric acid solution, boiling the solution, filtering and drying the residue, extracting the residue with alcohol, evaporating the alcohol, and mixing the resultant precipitate with finely divided metallic lead.

7. A lead acid storage battery electrode, the active material of which consists of spongy-lead particles which are submicroscopic in size, comprising one or more oxides of lead mixed with a precipitate resulting from the treatment of a compost of carbohydrates comprising plant residue or agricultural waste of the group including tanbark, straw, corn stalks, sawdust or leaves, with sulphuric acid solution, boiling the solution, filtering and drying the residue, extracting the residue with alcohol and evaporating the alcohol.

8. The method of preparing a paste for use in the manufacture of lead acid storage battery electrodes which comprises mixing finely divided metallic lead together with one or more oxides of lead and a substance resulting from the treatment of a compost of carbohydrates comprising plant residue or agricultural waste of the group including tanbark, straw, cornstalks, sawdust, or leaves, with sulphuric acid solution, boiling the solution, filtering and drying the residue, extracting the residue with alcohol and evaporating the alcohol.

9. The method of preparing a paste for lead acid storage battery electrodes which comprises mixing one or more oxides of lead selected from the group consisting of litharge, red lead, orange mineral, basic lead sulphate, or lead suboxide with a substance resulting from the treatment of a compost of carbohydrates comprising plant residue or agricultural waste of the group including tanbark, straw, cornstalks, sawdust, or leaves, with sulphuric acid solution, boiling the solution, filtering and drying the residue, extracting the residue with alcohol and evaporating the alcohol.

10. The method of preparing a paste for lead acid storage battery electrodes which comprises mixing finely divided metallic lead together with one or more oxides of lead selected from the group consisting of litharge, red lead, orange mineral, basic lead sulphate, or lead suboxide with a substance resulting from a treatment of a compost of carbohydrates comprising plant residue or agricultural waste of the group including tanbark, straw, cornstalks, sawdust, or leaves, with sulphuric acid solution, boiling the solution, filtering and drying the residue, extracting the residue with alcohol and evaporating the alcohol.

11. A paste for lead acid storage battery electrodes consisting of finely divided metallic lead together with one or more oxides of lead selected from the group consisting of litharge, red lead, orange mineral, basic lead sulphate, or lead suboxide and an alcohol soluble organic substance resulting from the treatment of a compost of carbohydrates comprising plant residue or agricultural waste of the group including tanbark, straw, cornstalks, sawdust, or leaves, with an acid solution, boiling the solution, filtering and drying the residue, extracting the residue with alcohol and evaporating the alcohol.

12. A paste for lead acid storage battery electrodes consisting of one or more oxides of lead selected from the group consisting of litharge, red lead, orange mineral, basic lead sulphate, or lead suboxide and an alcohol soluble organic substance resulting from the treatment of a compost of carbohydrates comprising plant residue or agricultural waste of the group including tanbark, straw, cornstalks, sawdust, or leaves, with an acid solution, boiling the solution, filtering and drying the residue, extracting the residue with alcohol and evaporating the alcohol.

JOHN A. SCHAEFFER.
HAROLD R. HARNER.